United States Patent
Gupta et al.

(10) Patent No.: US 10,817,809 B2
(45) Date of Patent: Oct. 27, 2020

(54) SYSTEMS AND METHODS FOR CUSTOMIZABLE ROUTE OPTIMIZATION

(71) Applicant: ServiceNow, Inc., Santa Clara, CA (US)

(72) Inventors: Sanjay Kumar Gupta, Saratoga, CA (US); Devinder Narang, Palo Alto, CA (US); Venkitesh Subramanian, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 231 days.

(21) Appl. No.: 16/047,778

(22) Filed: Jul. 27, 2018

(65) Prior Publication Data

US 2020/0034757 A1    Jan. 30, 2020

(51) Int. Cl.

| | | |
|---|---|---|
| *G06Q 10/00* | (2012.01) | |
| *G01C 21/34* | (2006.01) | |
| *G06N 20/00* | (2019.01) | |
| *G01C 21/00* | (2006.01) | |
| *G07C 5/00* | (2006.01) | |
| *G08G 1/00* | (2006.01) | |
| *G08G 1/16* | (2006.01) | |
| *G06Q 10/04* | (2012.01) | |
| *G06Q 10/06* | (2012.01) | |

(52) U.S. Cl.
CPC ....... *G06Q 10/047* (2013.01); *G01C 21/3484* (2013.01); *G06N 20/00* (2019.01); *G06Q 10/06311* (2013.01)

(58) Field of Classification Search
CPC ................ G06Q 10/00; G06Q 10/047; G06Q 10/06311; G01C 21/00; G01C 21/34; G01C 21/3484; G06N 20/00; B60R 25/33; B60R 25/102; G07C 5/00; G07C 5/008; G07C 5/0808; G08G 1/00; G08G 1/205

See application file for complete search history.

(56) References Cited

U.S. PATENT DOCUMENTS

| | | | |
|---|---|---|---|
| 6,028,537 A | * | 2/2000 | Suman .................... B60K 35/00 340/988 |
| 6,256,579 B1 | * | 7/2001 | Tanimoto ........... G01C 21/3484 701/424 |
| 6,609,122 B1 | | 8/2003 | Ensor |
| 7,020,706 B2 | | 3/2006 | Cates |
| 7,028,301 B2 | | 4/2006 | Ding |
| 7,062,683 B2 | | 6/2006 | Warpenburg |
| 7,131,037 B1 | | 10/2006 | LeFaive |
| 7,170,864 B2 | | 1/2007 | Matharu |
| 7,610,512 B2 | | 10/2009 | Gerber |
| 7,617,073 B2 | | 11/2009 | Trinon |
| 7,689,628 B2 | | 3/2010 | Garg |
| 7,716,353 B2 | | 5/2010 | Golovinsky |
| 7,769,718 B2 | | 8/2010 | Murley |
| 7,783,744 B2 | | 8/2010 | Garg |
| 7,890,802 B2 | | 2/2011 | Gerber |

(Continued)

*Primary Examiner* — Yonel Beaulieu
(74) *Attorney, Agent, or Firm* — Fletcher Yoder PC (57) ABSTRACT

Embodiments of the present disclosure are directed to providing, via a client instance hosted by an enterprise management data-center, an optimized travel route, including task assignment and scheduling, based at least on user configured criteria. Particularly, the client instance may execute an algorithm, trained via machine learning, to determine the optimized travel route in view of the user configured criteria.

20 Claims, 5 Drawing Sheets

(56) References Cited

U.S. PATENT DOCUMENTS

| | | |
|---|---|---|
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Meuller |
| 8,887,133 B2 | 11/2014 | Behnia |
| 9,065,783 B2 | 6/2015 | Ding |
| 9,081,472 B2 | 7/2015 | Knospe et al. |
| 9,097,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,672,734 B1 * | 6/2017 | Ratnasingam ....... G08G 1/0145 |
| 9,766,935 B2 | 9/2017 | Kelkar |
| 9,792,387 B2 | 10/2017 | George |
| 9,805,322 B2 | 10/2017 | Kelkar |
| 2011/0063301 A1 | 3/2011 | Setlur et al. |

\* cited by examiner

SYSTEMS AND METHODS FOR CUSTOMIZABLE ROUTE OPTIMIZATION

BACKGROUND

The present disclosure relates generally to route optimization.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In the realm of cloud computing, a user may utilize one or more computing resources to assign service tasks to technicians who are also in communication with the cloud resources. However, as in other contexts where tasks are assigned, such approaches may result in inefficient allocations of resources. For example, the service tasks may be assigned in an unproductive manner that may result in excessive travel times for the technicians.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A set of tasks may be inefficiently assigned to agents (e.g., field service agents) due to limited routing criteria and oversight. For example, tasks may be assigned to agents such that agents accrue unnecessary travel time to complete assigned tasks. In addition, agents that are unsuitable for a given task may be assigned to the task.

Accordingly, the present embodiments are directed toward efficiently assigning tasks to agents based at least on user configured criteria. For example, an underlying algorithm may consider a variety of inputs to generate an optimized travel route in view of the client configured criteria. The client configured criteria may indicate that the client wants to minimize travel time/costs, minimize labor costs, minimize overtime costs, adhere to a service-level agreement, utilize a certain number of agents, optimize customer experience, reduce response time, or other criteria. Accordingly, the algorithm may optimize the travel routes to satisfy, or optimize in view of, the client configured criteria. Further, the inputs that the algorithm considers may be adjusted to increase an accuracy of a metric computed for or associated with the generated travel route. For example, one of the metrics may be an estimated task completion time for an agent. However, the agent may take a longer time to complete the task than originally estimated. As such, the estimated task completion time for the agent may be adjusted accordingly when generating future travel routes. This feature may be referred to as machine learning in some contexts.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The specific embodiments described herein are shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Embodiments of the present disclosure are directed to optimizing a travel route (e.g., the scheduling and assignment of tasks) in view of user configured criteria. For example, a set of tasks (e.g., service tasks) may be scheduled and assigned to a group of agents (e.g., field service agents/technicians) in an optimized manner in view of one or more client priority preferences. Client priority preferences may indicate in which manner the client prefers the travel route to be optimized. For example, the client priority preference may indicate that the client prefers the travel route to be optimized to minimize travel time, to minimize agent overtime, to balance a distribution of tasks across agents, to maximize agent utilization, to minimize response time, or a combination thereof. An algorithm to schedule and assign tasks to agents may consider a variety of inputs when optimizing the travel route. For example, the algorithm may consider customer availability, agent availability, resource availability, a service level agreement, an appointment window, an agent skill level, agent travel time, agent availability, agent cost, preferred status of an agent, and so forth. In certain embodiments, some of the algorithm inputs or outputs may be adjusted utilizing machine learning. For example, if the algorithm estimates a first completion time of a task, but the task ends up requiring a second, unexpected completion time, the machine learning aspect may adjust the estimated completion time for the task accordingly when determining future schedules and assignments. In this manner, the algorithm to optimize the travel route to perform tasks may be highly configurable in response to client input to provide tailored schedules and assignments to fulfill the client's needs.

Figure 1:
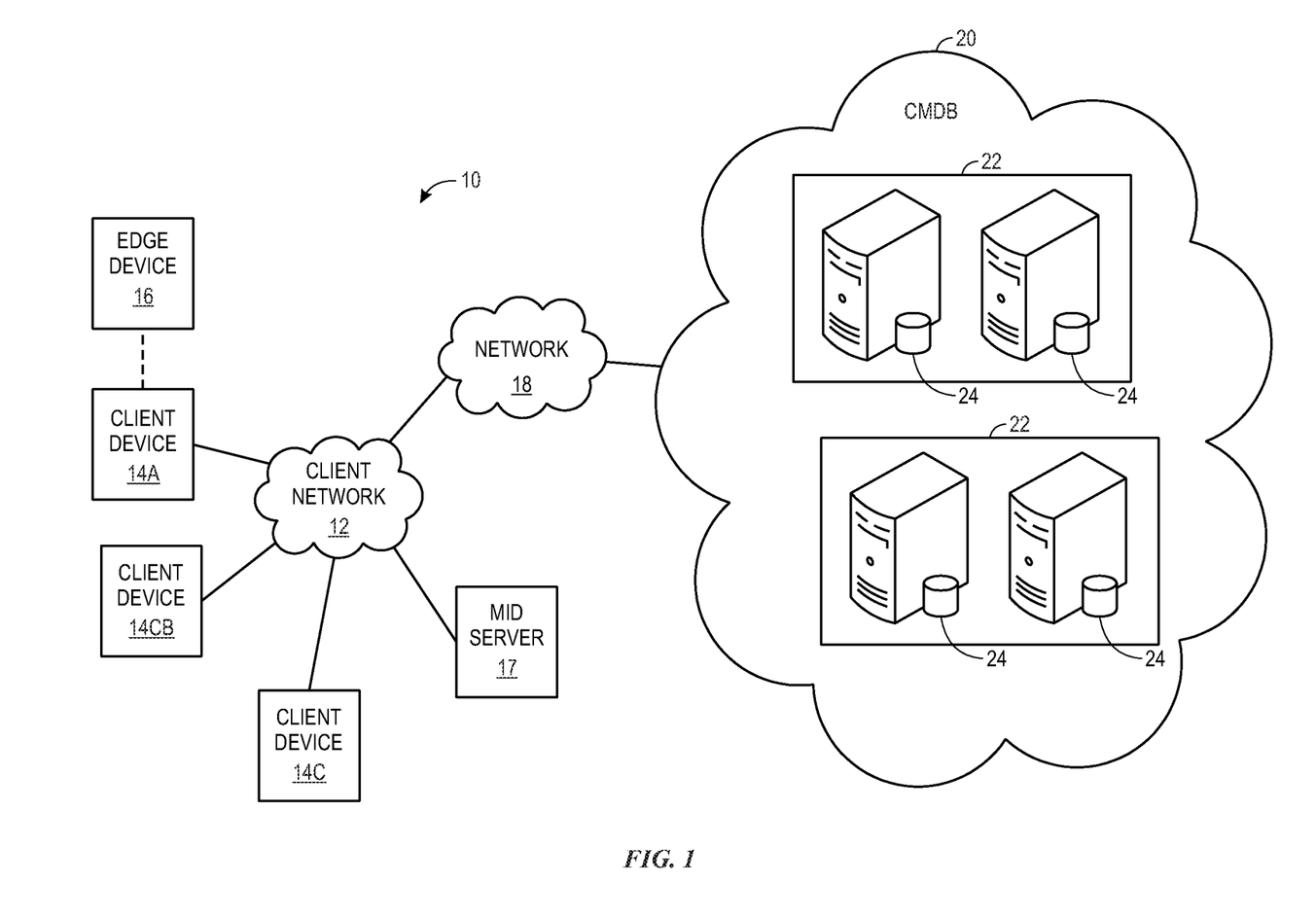
FIG. 1 is a block diagram of an embodiment of a cloud computing system in which embodiments of the present disclosure may operate.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform 20 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administrative or managerial server (e.g., a management, instrumentation, and discovery (MID) server 17) that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server 24 can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
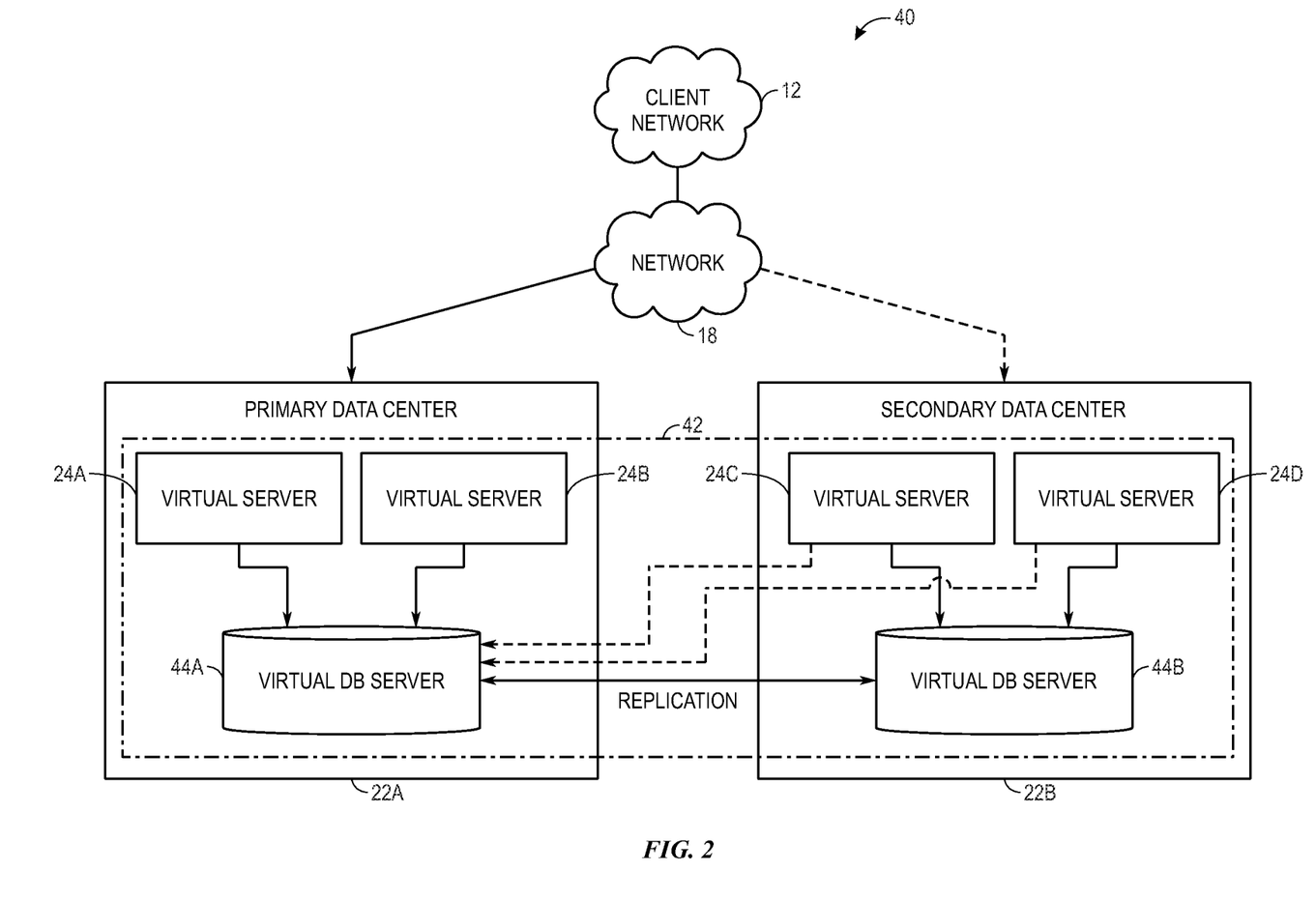
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances but are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may replicate data to the secondary virtual database server 44B using, e.g., a Master-Master My SQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
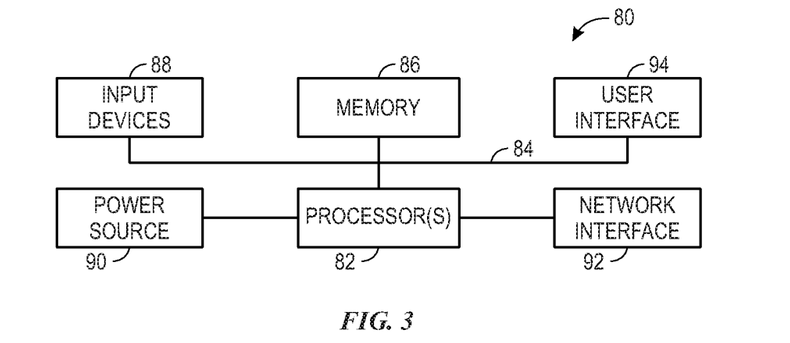
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media.

Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
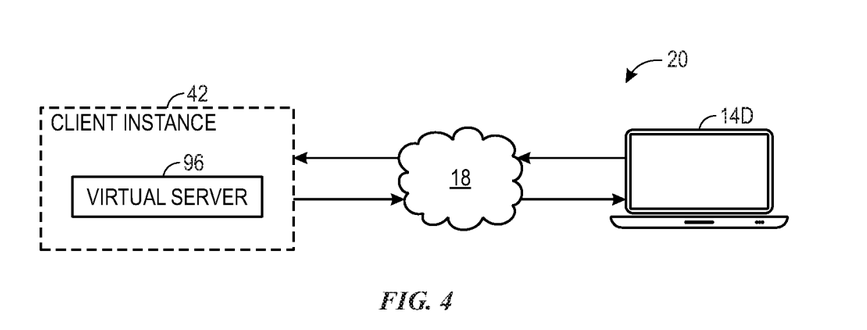
FIG. 4 is a block diagram illustrating an embodiment in which a virtual server supports and enables the client instance, in accordance with aspects of the present disclosure.

As mentioned above, present embodiments are directed toward optimizing the scheduling and assignment of tasks. With the preceding in mind, FIG. 4 is a block diagram illustrating an embodiment in which a virtual server 96 supports and enables the client instance 42, according to one or more disclosed embodiments. More specifically, FIG. 4 illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

The present approach may rely on computational and communication architectures as described above to implement route optimization. It should also be appreciated, however, that descriptions or discussion of particular architectures and frameworks is for the purpose of illustration only and to provide useful, concrete examples of possible implementations. Indeed, with respect to the techniques discussed herein, these techniques may be implemented in a multi-instance architecture as described herein, a multi-tenant architecture, a client-server or public network (i.e., Internet) context, or, in some instances, on a single computer or server suitably configured.

Figure 5:
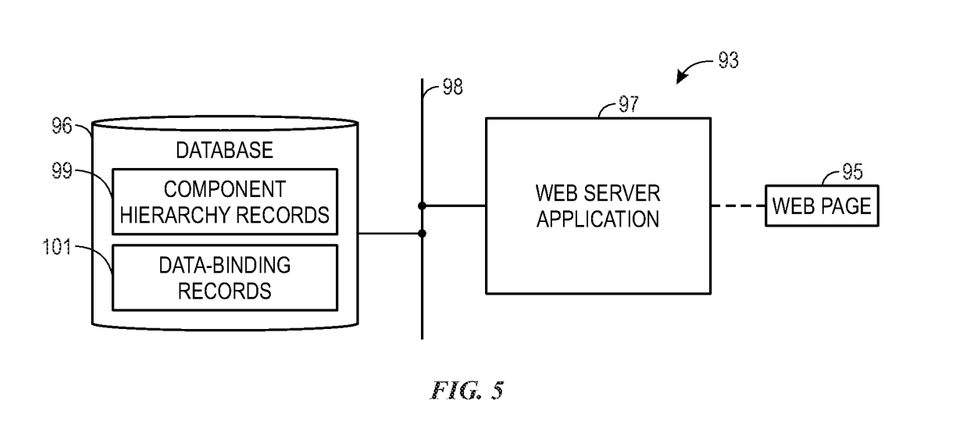
FIG. 5 is a block diagram of a computing system that may be present in FIGS. 1, 2, and/or 3, in accordance with aspects of the present disclosure.

With the preceding background in mind, and turning to FIG. 5 in certain embodiments, a computing system 93, such as the computing system 10, may enable a web developer to compose a web page 95 provided to a user over a client instance 42 for facilitating routing of an agent. The web page 95 may be composed through use of custom web components and references to underlying script libraries that may be updated or changed by a provider of the computing system when desired, as illustrated FIG. 5. Particularly, the computing system 93 may enable the web developer to compose such a web page 95 declaratively, with markup that declares desired structure and operation of the web page 95, without the need for the developer to engage in imperative coding to define how to achieve those results. Further, the web components of the computing system 93 may be structured to support inter-component data binding, and the computing system 93 may enable a web developer to declaratively bind properties of components on the web page 95 to actions emitted by other components on the web page 95. For example, as shown in FIG. 5, the computing system 93 includes a database 96, such as the cloud-based platform 20, and a web server application 97, which may be integrated or interconnected by a network, such as the network 18, or other connection mechanism 98.

As illustrated, the database 96 contains interrelated records, such as a plurality of component hierarchy records 99 cooperatively defining a hierarchical arrangement of components of the web page 95, including references to underlying scripts interpretable to define structure and operation of the components of the web page 95. The database 96 may contain further interrelated records, such as a plurality of data-binding records 101 cooperatively defining data-bindings between the components of the web page 95.

The web server application 97 executes on a computing device and is configured to carry out various web server operations (e.g., to cause the computing device to carry out the operations). For instance, the web server application 97 is configured to receive from a client device a request for the web page 95. In one implementation, the web server application 97 is configured to respond to the request by (i) querying the database 96 to ascertain a component tree-structure representing the hierarchical arrangement of the components of the web page 95 and to ascertain the data-bindings between the components of the web page 95, (ii) based on the ascertained component tree-structure and data-bindings, constructing a markup document that represents the ascertained component tree-structure and data-bindings and includes a component loader operative to load the underlying scripts, and (iii) outputting the constructed markup document for rendering by a web browser executing on the client device.

In line with the discussion above, the web server application 97 may be further configured to receive user input declaring the structure and operation of the web page 95, including declarations of the hierarchical arrangement of the components of the web page 95 and the data-bindings between the components of the web page 95. And the web server application 97 may be configured to respond to the user input by generating and storing, cooperatively in a plurality of tables of the database 96, the plurality of interrelated records cooperatively defining the hierarchical arrangement of the components of the web page 97 and the plurality of interrelated records cooperatively defining the data-bindings between the components of the web page 96, to facilitate the querying and constructing.

Further, the interrelated records (e.g., the component hierarchy records 99 and the data-binding records 101) of the database 96 may include a root-element record, a plurality of page-element records, a plurality of component records, and a plurality of data-binding records. The root-element record may define a top level of the web page. The plurality of page-element records may cooperatively define the component tree structure of the components of the web page 95, with each page-element record including a component-reference that references a respective one of the component records and including a parent-reference that references an associated parent node of the tree structure.

Each component record may define a respective component of the web page 95 and may include a script-reference that references associated underlying script that is interpretable by the web browser to define structure and operation of the component. And the data-binding records may define data-binding between (i) actions to be published by certain components of the web page 95 based on state change of the components and (ii) properties of other components of the web page 95.

With this arrangement, the act of querying the database 96 to ascertain the component tree-structure defining the hierarchical arrangement of the components of the web page 95 may involve querying the database 96 to identify the root-element record of the web page 95 and recursively querying the database 96 based on the parent-references in the page-element records, to establish the component-tree structure defining the hierarchical arrangement of the components of the web page 95.

Further, the web server application 97 may be configured to provide a user interface through which to receive the user input declaring the structure and operation of the web page 95. For instance, the user interface may define a menu of components and may enable user selection, from the menu of components, of components to be included on the web page 95 and user designation of hierarchy and data-bindings between the components. As an example, each such component, including the underlying scripts interpretable to define the structure and operation of the components, may be defined in advance of receiving the user input. With this arrangement, the underlying scripts may expose APIs of the components, and the declarations may make use of the exposed APIs. Further, the underlying scripts may be swappable while maintaining the exposed APIs. Further, it should be noted that in some embodiments, the user interface may be implemented via the webpage 95. That is, the web page 95 may receive user input declaring the structure and operation of the web page 95, as described above. In such embodiments, the web server application 97, the web page 95, and/or the user interface may be referred to as a "workspace" configured to provide the custom web components, as described herein.

The data center 22 (e.g., enterprise management data center) may implement an algorithm via the client instance 42 to determine an optimized schedule and assignment (e.g., travel route) based on user configured criteria, such as a client priority preference. However, the user configured criteria may further include additional constraints/parameters when determining the travel route. Generally, a client (e.g., a user) may utilize a workspace, such as the web server application 97, the web page 95, and/or the user interface, which may be accessed through the client instance 42, to utilize the algorithm in determining an optimized schedule and assignment for performing service tasks. More specifically, the client, or user, may have a set of tasks that are to be performed by agents (e.g., field agents) at the request of customers. The client may utilize the algorithm to determine an efficient way to perform each of the tasks such that the performance, or execution, of the tasks meets certain criteria (e.g., standards) defined by the client.

Figure 6:
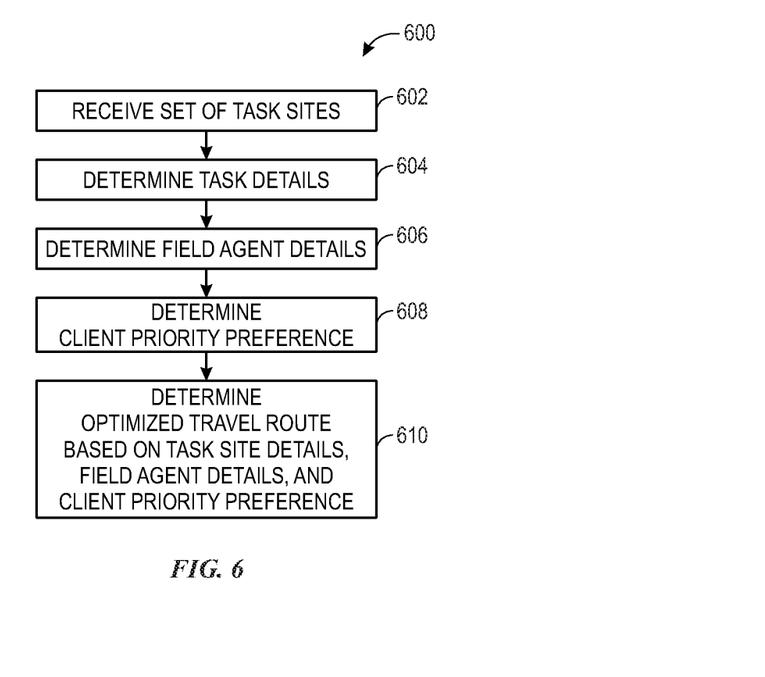
FIG. 6 is a block diagram of process that may be implemented via a computing system that may be present in FIGS. 1, 2, and/or 3 and that may utilized to determine an optimized travel route, in accordance with aspects of the present disclosure.

Keeping this in mind, FIG. 6 is flow chart of an embodiment of a process 600 to generate an optimized travel route (e.g., scheduling of tasks and assignment of tasks to agents) to perform a set of tasks (e.g., service tasks). The process 600 may be implemented via the client instance 42, the network 18, the platform 20, or a combination thereof. At block 602, a set of tasks (e.g., service tasks) are received. In certain embodiments, the set of tasks may be submitted by one or more customers, or uploaded by the client, such as through the client instance 42. In certain embodiments, the set of tasks may be submitted via interaction points of the client instance 42, as discussed below. Tasks may include, for example, installation of a system (e.g., a network), system/component maintenance or repair, troubleshooting, delivery of a component, and so forth.

The set of tasks may be associated with task details, which are determined at block 604. For example, each task of the set of tasks may be associated with a set of constraints, or task details, which should be considered when assigning the task to an agent and when scheduling the task. The task details for a service task may include, for example, customer availability, resource availability, a location of the task, and a task dependency. That is, the task details may be considered user configured criteria. Data indicative of the task details may be received in conjunction with the receipt of the set of tasks at block 602.

Customer availability (e.g., an appointment window) may refer to a time range to perform the task as requested by the customer (e.g., the party that requested the task). Customer availability may also be defined by business/visiting hours of the customer, such as when the account/company associated with the customer is open and willing to have work performed. Customer availability may further refer to blackout hours, such as when a particular asset associated with the task cannot be worked on. For example, if the task is related to maintenance of a network, blackout hours may be associated with high traffic times of the network.

The resource availability may refer to a list of items/tools/components required to complete the task and the availability of such resources. For example, a certain part or special vehicle may be required to complete the task, but may not be available until a specific date. Accordingly, the task should not be scheduled until all of the required resources to complete the task are available. As a further example, a certain resource may be readily accessible to a first agent and not to a second agent. Accordingly, the task should be assigned to the first agent over the second agent.

The location of the task may refer to the physical geographic location of the task. The location of the task may be associated with a set of geographic coordinates and/or an address. Specifically, the location of the task may be considered when determining travel times to/from the task and when determining which agent to assign to the task. For example, tasks may be assigned to agents that would have less travel time to and from the location of the task. Further, in certain embodiments, the location of the task may be outside of a predefined geographic region in which agents are available to perform the task. In such embodiments, the task may not be assigned (such as if the task location is outside of a geographic area that is serviced by the client) or may be assigned when an agent becomes available in the region associated with the task location.

The task dependency may refer to the dependency of a first task relative to one or more other tasks. For example, in certain embodiments, the first task may only be performed once one or more other tasks have first been completed. Accordingly, the first task should not be scheduled until a time when the one or more other tasks have been completed.

Further, the assignment and scheduling of the tasks may depend on agent details, which are determined in block 608. Agent details may include, for example, a skill level of an agent, agent cost, a location of the agent, resources available to the agent, a preferred status of the agent, and the workload of the agent. As discussed below, the agent details may be determined based on data received through interaction points of the client instance 42.

The skill level of the agent may refer to a skill set of the agent, one or more certifications possessed by the agent, and/or a proficiency of the agent in performing tasks. For example, in certain embodiments, the skill level may be analogous to accumulated experience of the agent. That is, agents with more experience may be associated with higher skill levels. Further, in certain embodiments, the skill level of the agent may refer to certain task types that the agent is particularly proficient, or adept, at performing. For example, an agent that has completed a large amount of network installations may be associated with a high skill level for network installations. In some embodiments, the skill level of an agent may be associated with an estimated completion time of a certain task. That is, an agent with a high skill level may be estimated to complete the certain task quicker than an agent with a low skill level.

The location of the agent may refer to the physical geographic location of the agent, and the location of the agent relative to locations of tasks. In certain embodiments, the location of the agent may be determined from the agent manually checking in, or updating their location, such as updating their location to a task site location of an assigned task. Indeed, the location of an agent may be a last known location of the agent, which may be associated with a task site location or a starting location (e.g., home location). Further, the agent location may be determined through functions of a mobile device, such as a computing device, a cell phone, or other device capable of transmitting data indicative of its location to the computing system 10 and/or the platform 20 through the client instance 42. Particularly, in certain embodiments, the agent location may be determined via a global positioning system (GPS). The agent location may be associated with a set of latitude and longitude coordinates and/or an address.

The resources available to the agent may refer to resources that are readily accessible to the agents. For example, available resources may refer to resources that the agent has on hand, such as within their work vehicle or on their person. In certain embodiments, resource availability may refer to a vehicle status, such as vehicle type (e.g., tall ladder), a vehicle condition (gas, maintenance record, etc.), and vehicle availability. Resources may further include tools (e.g., a crane, a drill, etc.) and/or parts (e.g., network/computer components, cables, etc.). In some embodiments, available resources may be associated with a travel time between the current location of the agent and a location of a resource needed to complete a task. For example, a resource or part may be stored in a warehouse. Accordingly, the algorithm may consider a travel time between the agent and the resource when determining the resources available to the agent.

The preferred status of an agent may refer to whether the agent is flagged as "preferred" for a particular customer, or for a particular type of task. For example, if a customer receives a quality work product from a particular agent, the customer may indicate that the customer prefers to work with the same agent on future tasks. Accordingly, the agent may be flagged as preferred for the client, and depending on the user configured criteria, the algorithm may assign tasks to agents that have been flagged as preferred by customers associated with the tasks.

The workload of the agent may refer to the total number of tasks (or the total amount of work time associated with tasks) assigned and scheduled for an agent in a given working period. Depending on the user configured criteria as discussed below, the algorithm may balance a workload of a set of agents. For example, the algorithm may consider the workload of each agent of the set of agents and may assign tasks to the set of agents such that the respective workloads of the agents are substantially matched. In other embodiments, the algorithm may consider the workload of the agents and assign tasks such that each agent in the field has a substantially full workload for a given working period. In this manner, by splitting the tasks among fewer agents, the number of active agents in the field may be reduced.

Further still, the assignment and scheduling of the tasks, or route optimization, may depend on a client priority preference (e.g., user configured criteria), which is determined in block 610. As discussed above, the user may define criteria in which the assignment and scheduling of tasks may be optimized with respect to one, some, or all agents being routed. For example, the user may indicate that the assignment and scheduling of tasks is to minimize travel time, minimize travel distance, minimize labor costs, minimize overtime costs, maximize agent utilization, maximize skill matching, maximize preferred agent utilization, minimize response time, or a combination thereof.

Minimizing travel time may refer to minimizing the total time spent traveling to and from (e.g., between) task locations by a set of agents. In certain embodiments, minimizing the travel time may also be associated with travel costs, which may be assessed based on missed working hours of the agent, which may vary based on respective agents' salary/billing hours. Similarly, minimizing travel distance may refer to minimizing the total distance traveled to and from (e.g., between) task sites by a set of agents. In certain embodiments, the total distance travel may be associated with travel costs that are based on the total distance, which may be assessed based on gas prices and the fuel efficiency of the agent's vehicle. Indeed, the total distance traveled may be positively correlated with the total time traveled of the set of agents, which may both be related to overall travel costs. Thus, in certain embodiments, minimizing the total time spent traveling and minimizing the total distance traveled may be combined into a single metric of minimizing travel costs. Further, in certain embodiments, the travel time and/or travel distance may be estimated using calls to third party application programming interfaces (APIs). In some embodiments, the travel time and/or travel distance may be estimated using straight line distances and regional average speeds, or previous data, if a particular route between task sites has been previously travelled.

Minimizing labor costs may refer to minimizing the total cost associated with a set of agents performing the set of assigned tasks. In some embodiments, the labor costs may be dependent on the amount of time agents spend working on a task. For example, if an agent is payed based on total hours worked, the labor costs may be higher for an agent with a higher billing rate to complete a task when compared to an agent with a lower billing rate to complete the task. However, in minimizing labor costs, the algorithm also considers that agents with lower billing rates may require more time to perform a task than agents with higher billing rates.

Minimizing overtime may refer to minimizing the total time spent by a set of agents to complete the set of tasks while working overtime (e.g., working outside of normal business hours, or working excess hours, such as above 8 hours per day). In certain embodiments, minimizing overtime may be associated with minimizing a cost of overtime. For example, as discussed above with reference to minimizing labor costs, agents may be associated with respective billing rates. Accordingly, the overtime labor costs may be higher for certain agents with higher billing rates. As such, assigning tasks that require overtime to complete may result in lower costs if assigned to certain agents with lower billing rates.

Maximizing agent utilization may refer to maximizing the amount of tasks that are performed by each agent. Indeed, agent utilization may be related to the workload of the agents, as discussed above. For example, it may be cheaper for the client to assign a set of six tasks to two agents, where each agent performs three tasks, than to assign the set of six tasks to three agents, where each agent performs two tasks. That is, depending on the pay structure of the client, it may be cheaper to have two working agents in the field instead of three working agents in the field.

Maximizing skill matching may refer to matching a skill level associated with an agent with a preferred skill level of a certain task. For example, the client may want to assign a task requiring a certain skill level to an agent having the necessary skill levels to complete the task.

Maximizing preferred agent utilization may refer to matching preferred agents to certain tasks associated with certain customers. For example, as discussed above, a customer may identify certain agents as preferred agents, which may be a result of a high skill level of the agents or a high level of customer satisfaction based on previous experiences. Similarly, a customer may identify certain agents as blacklisted agents, which may be associated with a low skill level of the agents or a low level of client satisfaction based on previous experiences. Accordingly, in maximizing the preferred agent matching, the client may want to assign tasks to customer-preferred agents and avoid assigning tasks to customer-blacklisted agents.

Further, minimizing response time may refer to minimizing the time between the client requesting the task, or service, and an agent arriving at the task site location. For example, to minimize response time, the tasks may be assigned to agents that would have a minimal travel time to the task site.

Once the route data indicative of the task site details, the field agent details, and the client priority preference has been determined in blocks 604, 606, and 608, respectively, one or more optimized travel routes may be generated at block 610. Particularly, as discussed herein, determining the travel route may include the scheduling of tasks and the assignment of tasks to agents, which is optimized in view of the client priority preference while treating certain task and agent details as constraints. For example, the algorithm may iterate through all possible combinations of assignment and scheduling, and assess each travel route based on adherence to the user configured criteria. In certain embodiments, as discussed below, the client may be provided with an option to select among multiple travel routes, each of which may have respective metric ratings based on adherence of the travel routes to the client priority preference.

Figure 7:
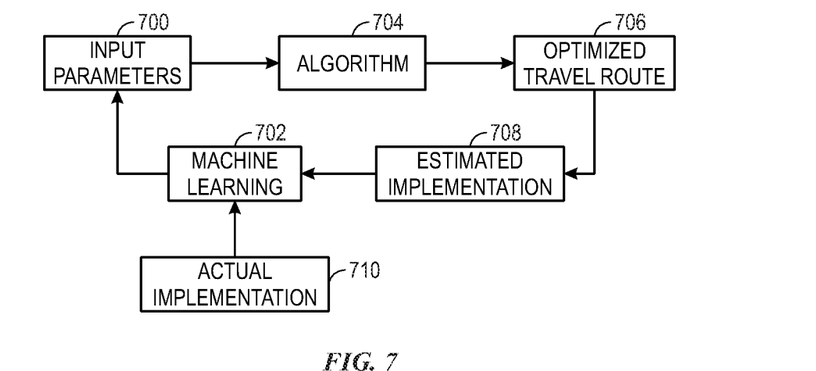
FIG. 7 is an embodiment of a process that may utilize machine learning to determine the optimized travel route of FIG. 6, in accordance with aspects of the present disclosure.

As discussed below, in certain embodiments, the algorithm may be improved, or increased in accuracy, by utilizing machine learning, such as a feedback loop, an artificial neural network, or other corrective learning approach. In other words, the algorithm may be a trained algorithm subject to correction and/or refinement in view of observed versus expected results. For example, as shown in FIG. 7, input parameters 700, such as task site details and field agent details may be adjusted (e.g., better informed) utilizing machine learning 702. To illustrate, an algorithm 704 (e.g., to optimize the scheduling and assignment of tasks) may consider the input parameters 700 to generate an optimized route 706 in view of the user configured criteria, such as the client priority preference, included in the input parameters 700.

As an example, the client may choose to optimize the optimized travel route 706 in view of minimization of cost. In such instances, the algorithm 704 may account for the travel time, billing rate, skill level of each agent, over time, and any other metric that may indicate a cost. Tasks may be avoided being assigned to agents with higher travel times and more expensive labor/billing rates. However, algorithm 704 also takes into consideration that agents with less expensive labor/billing rates and/or lower skill levels may take longer to complete a task.

Generally, the algorithm 704 may evaluate all possible schedule and assignment combinations to determine the optimized travel route(s) 706 that is best suited for achieving the goals of the client priority preference. In some embodiments, the algorithm 704 may continuously optimize the travel routes 706 based on unassigned (e.g., incoming) tasks. That is, in certain embodiments, the optimized travel route 706 determined by the algorithm 704 may be tentative or otherwise subject to modification in that the algorithm 704 may reevaluate the optimized travel route 706 as new tasks are created/requested/submitted.

To illustrate, an optimized travel route 706 may be determined and selected, and a set of agents may be accordingly assigned a set of tasks for a working period with a set schedule. However, a new task may be created that is associated with a service-level agreement (SLA) necessitating that the task be completed within a limited time frame. Accordingly, the algorithm 704 may consider the schedule and assignment of every agent within the set of agents, and may assign and schedule the task such that the task is performed within the constraints outlined in the SLA and such that the travel routes of the agents are still optimized in view of the client priority preference. Indeed, the optimized travel route 706 may be adjusted due to other changing conditions as well, such as priority changes, assignment changes, route changes, traffic conditions, and so forth. For example, an agent may have to travel to an unexpected location to pick up a component for a task. As such, the algorithm 704 may take into account the adjusted travel route of the agent and may update the optimized route 706 accordingly.

In some embodiments, the algorithm 704 may reassess the optimized travel route 706 periodically or continuously, such as after the completion of tasks. Indeed, the tasks may take unexpected amounts of time to complete, which may affect the optimized travel route 706. In some embodiments, the algorithm 704 may update the optimized travel route 706 based on current locations of the agents. The current locations of the agents may be determined utilizing geolocation tracking, such as via a GPS, personal computing device, etc. The current locations of the agents may also be assessed as the last known locations, which may be the task site location, a manually input location, a home location, or an end location.

In some embodiments, the client may set additional constraints to the algorithm 704 in determining the optimized travel route 706. To illustrate, the user may manually assign and/or schedule portions of a set of tasks, which may be considered by the algorithm 704 when determining the optimized travel route 706. That is, the algorithm 704 may consider the manual user assignment and scheduling of the portion of the set of tasks as constraints when generating the optimized travel route 706 for the remainder of the set of tasks that have not been manually assigned/scheduled. In the same line, in some embodiments, the user may select only a portion of the set of tasks and/or only a portion of available agents that the algorithm 704 is to consider when determining the optimized route 706. In other words, the user may choose to have the algorithm 704 ignore a portion of the tasks and/or a portion of the agents when determining the optimized travel route 706. Still further, the user may choose to have the algorithm 704 only optimize only a portion of agents' available working hours. For example, in certain embodiments, the client may choose to have a portion of the agents, and/or portions of the agents' available working hours, determined via the algorithm 704. Indeed, in certain embodiments, the agents may be assigned tasks and/or schedule tasks according to other methods. For example, in certain embodiments, agents may be allowed to self-assign, such as by pulling asks from a queue, which may be accessed via the workspace, described above, and/or via the client instance 42.

As discussed above, the machine learning 702 may be utilized to better inform, or increase an accuracy of, the input parameters 702. Generally, the machine learning 702 may estimate a certain value for an input parameter 700, such as an estimated completion time for a task or an estimated required agent skill level for a task. However, an estimated implementation 708 of a value may vary from an actual implementation 710 of the value. For example, a task may take an unexpected amount of time to complete, or may be more or less complicated than the capabilities of the estimated agent skill level. As such, the machine learning 702 may compare the estimated implementation 708 of the input parameter 700 to the actual implementation 710 of the input parameter, and may adjust the input parameter 700 based on the comparison. Indeed, in certain embodiments, the estimated implementation 708 of the input parameter 700 may be a result of an average of past implementations of the input parameter 700. For example, the algorithm 704 may consider previous performances of a certain kind of task when determining the input parameters 700 for the certain kind of task.

Further, in certain embodiments, the estimated implementation 708 may be considered analogous to the input parameter 708. That is the input parameters 700 may be considered estimations, in some embodiments. Further, it should be noted that the actual implementations 710 may be determined based on the changing locations of the agents. That is, utilizing data indicative of the geographic positions of the agents, the machine learning 702 may determine how long an agent took to complete a task, how long an agent spent travel between tasks, and so forth.

In this manner, the algorithm 704 may be a trained algorithm that is trained based on previously stored data. Particularly, the client instance 42 and/or the data center 22 may store data related to past travel times, past performances of certain agents on certain tasks (e.g., skill levels), and so forth. The algorithm 704 may consider this previously stored data when determining the optimized travel route 706. Accordingly, in certain embodiments, the algorithm 704 may be trained by the client instance 42, the data center 22, or both.

As discussed above, one or more travel routes 706 may be determined in view of the user defined criteria. Particularly, in certain embodiments, the algorithm 704 may determine multiple travel routes 706 based on the user defined criteria, where each of the multiple travel routes 706 may adhere to the user defined criteria to various degrees. The client may then select a travel route 706 from the multiple travel routes

Figure 8:
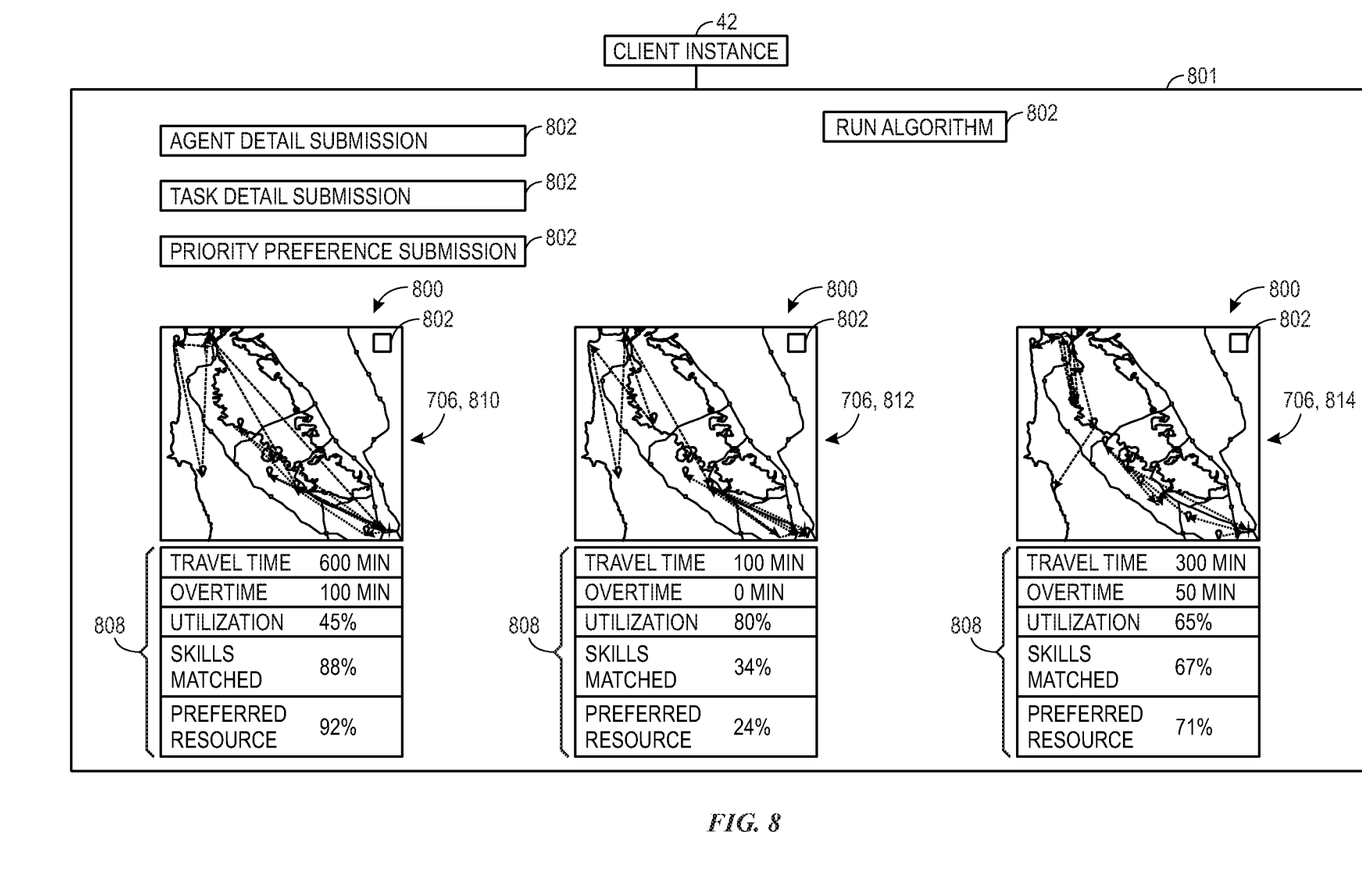
FIG. 8 is an embodiment of a plurality of optimized travel routes provided via an instance of the multi-instance cloud architecture FIG. 2, in accordance with aspects of the present disclosure.

706. To illustrate, FIG. 8 shows an embodiment of the client instance 42 configured to display representations 800 of the travel routes 706 via a user interface 801. Indeed, as discussed above, the algorithm may have been executed via the client instance 42.

More generally, the client instance 42 may provide interaction points 802, or selectable icons, in which the user may utilize to submit the agent details, submit the task details, select the client priority preference, select the travel route 706, or a combination thereof. In some embodiments, the client instance 42 may automatically receive the agent details and/or the task details as the agent details and/or task details are updated or created. For example, when a task is created/requested, the client instance 42 may automatically receive data indicative of the task details. That is, the client instance 42 may be communicatively coupled to a computing device configured to receive inputs related to new tasks. Similarly, as agent details are updated, the client instance 42 may automatically receive data indicative of the updated agent details. The client instance 42 may further provide interaction points 802 that the user may select to initiate the algorithm.

Once the algorithm has been executed, the algorithm may generate one or more optimized travel routes 706 based on the agent details, the task details, and the client priority preference. Indeed, as mentioned above, the algorithm may generate multiple travel routes 706. The client instance 42 may then display, via the user interface 801, metrics 808 of the travel routes 706 related to the client priority preference. For example, metrics 808 of a first travel route 810 indicate that the first travel route 810 results in a high percentage tasks receiving a preferred resource (e.g., a preferred agent), and a high percentage of tasks being assigned to agents with suitable skill levels. However, the metrics 808 of the first travel route 810 also show that the first travel route 810 would result in a high amount of travel time for the agents assigned to the tasks. Further, the metrics 808 of a second travel route 812 indicate that the second travel route 812 would result in low travel time and low overtime. Still further, the metrics 808 of a third travel route 814 would result in moderate travel time, overtime, skill matching, and so forth. In other words, the client instance 42 may rate the travel routes 706 based on their adherence to one or more of the client priority preference, as discussed above. The client may then make an informed decision based on the metrics 808 to select a preferred travel route 706 (e.g., via an interaction point 802). Once the client has selected a travel route 706, the client instance 42 may communicate the assignments and schedule of the travel route 706 to computing devices associated with the agents, or other users (e.g., administration personnel), such that the agents may be informed of their respective travel routes for a working period. Further, in some embodiments, the client instance 42 may automatically select the travel route 706 and/or may only generate one travel route 706 via the algorithm based on the client priority preference.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
an enterprise management datacenter remotely located from one or more client networks;
a client instance hosted by the enterprise management datacenter for the one or more client networks, wherein instructions executed by the enterprise management datacenter causes the system to perform operations comprising:
configuring interaction points for the client instance;
receiving route data from an external cloud-based platform based at least on the interaction points, wherein the route data indicates a plurality of tasks, a plurality of field service agents, and a client priority preference;
providing the route data as an input to a trained algorithm, wherein the route data comprises an availability of a corresponding customer associated with each task of the plurality of tasks, dependencies between the plurality of tasks, locations for each of the plurality of tasks, a list of components to perform the plurality of tasks, a starting location of each of the plurality of field service agents, an ending location of each of the plurality of field service agents, and a list of materials available to each of the plurality of field service agents;
determining a travel route via the trained algorithm based on the route data; and
making the travel route accessible on the client instance.

2. The system of claim 1, wherein the trained algorithm is trained via the client instance utilizing data indicative of past task implementations.

3. The system of claim 1, wherein the trained algorithm is trained via the enterprise management datacenter utilizing data indicative of past task implementations.

4. The system of claim 1, wherein the trained algorithm is trained utilizing previously stored data indicative of past implementations of tasks.

5. The system of claim 1, wherein the client priority preference comprises a minimization of cost, and wherein the trained algorithm determines the travel route based on the client priority preference by comparing multiple travel routes and selecting the travel route from the multiple travel routes having a least associated cost.

6. The system of claim 1, wherein the instructions executed by the enterprise management datacenter causes the system to perform operations comprising:
determining a plurality of travel routes;
making the plurality of travel routes accessible on the client instance; and
receiving a selection of a travel route of the plurality of travel routes based on the interaction points of the client instance.

7. The system of claim 1, wherein the client priority preference comprises minimization of travel time, minimization of travel distance, maximization of agent utilization, minimization of response time, or a combination thereof.

8. The system of claim 1, wherein the route data provided as the input to the trained algorithm comprises respective skill levels associated with each of the plurality of field service agents.

9. The system of claim 1, wherein the route data provided as the input to the trained algorithm comprises respective preference statuses associated with each of the plurality of field service agents.

10. A method, comprising:
receiving, via a client instance, data indicative of a set of tasks;
receiving, via the client instance, data indicative of a set of agents;
receiving, via the client instance, data indicative of a client priority preference;
providing the data indicative of the set of tasks, the set of agents, and the client priority preference as inputs to a trained algorithm, wherein the trained algorithm is trained utilizing machine learning;
receiving, via the client instance, a manually created travel route for a first portion of the set of task and a second portion of the set of agents; and
determining a travel route utilizing the trained algorithm, wherein the travel route comprises a schedule of the set of tasks and an assignment of the set of tasks to the set of agents, and wherein the travel route is determined based on the client priority preference and the manually created travel route.

11. The method of claim 10, wherein the data indicative of the set of tasks comprises data indicative of an availability of a customer associated with a task of the set of tasks, an availability of resources to perform the set of tasks, locations of the set of tasks, dependencies of the set of tasks, or a combination thereof, and wherein the travel route is based on the data indicative of the set of tasks.

12. The method of claim 10, wherein the data indicative of the set of agents comprises data indicative of skill levels of agents of the set of agents, costs associated with the set of agents, geographic locations of the agents of the set of tasks, resources available to the set of agents, preference statuses of the set of agents, workloads of the set of agents, or a combination thereof, and wherein the travel route is based on the data indicative of the set of agents.

13. The method of claim 10, wherein the data indicative of the client priority preference comprises data indicative of minimization of travel time, minimization of travel distance, minimization of cost, maximization of agent utilization, minimization of response time, or a combination thereof.

14. The method of claim 10, comprising:
determining a plurality of travel routes utilizing the trained algorithm;
displaying, via a user interface of the client instance, metrics of the plurality of travel routes based on adherence of the plurality of travel routes to the client priority preference; and
receiving, via the client instance, a selection of a first travel route of the plurality of travel routes.

15. A non-transitory, computer readable medium comprising instructions, wherein the instructions are configured to be executed by a processor to perform operations comprising:
receiving, via a client instance, data indicative of a set of tasks;
receiving, via the client instance, data indicative of a set of agents, wherein the data indicative of the set of agents comprises data indicative of skill levels of the set of agents, costs associated with the set of agents, geographic locations of the set of tasks, resources available to the set of agents, statuses of the set of agents, workloads of the set of agents, or a combination thereof;
receiving, via the client instance, data indicative of a client priority preference;
providing the data indicative of the set of tasks, the set of agents, and the client priority preference as inputs to a trained algorithm, wherein the trained algorithm is trained utilizing machine learning; and
determining a travel route utilizing the trained algorithm, wherein the travel route comprises a schedule of the set of tasks and an assignment of the set of tasks to the set of agents, and wherein the travel route is determined based on the client priority preference and the data indicative of the set of agents.

16. The non-transitory, computer readable medium of claim 15, wherein the data indicative of the set of tasks comprises data indicative of an availability of a customer associated with a task of the set of tasks, an availability of resources to perform the set of tasks, locations of the set of tasks, dependencies of the set of tasks, or a combination thereof, and wherein the travel route is based on the data indicative of the set of tasks.

17. The non-transitory, computer readable medium of claim 15, wherein the data indicative of the client priority preference comprises data indicative of minimization of travel time, minimization of travel distance, minimization of cost, maximization of agent utilization, minimization of response time, or a combination thereof.

18. The non-transitory, computer readable medium of claim 15, wherein the operations comprise:
determining a plurality of travel routes utilizing the trained algorithm;
displaying, via a user interface of the client instance, metrics of the plurality of travel routes based on adherence of the plurality of travel routes to the client priority preference; and
receiving, via the client instance, a selection of a first travel route of the plurality of travel routes.

19. The non-transitory, computer readable medium of claim 15, wherein the trained algorithm is trained via the client instance utilizing data indicative of past task implementations.

20. The non-transitory, computer readable medium of claim 15, wherein the trained algorithm is trained utilizing data indicative of past task implementations, utilizing previously stored data indicative of past implementations of tasks, or both.

* * * * *